US009007029B2

(12) United States Patent
Vuorilehto et al.

(10) Patent No.: US 9,007,029 B2
(45) Date of Patent: Apr. 14, 2015

(54) METHOD AND SYSTEM FOR MANAGING THE STATE OF CHARGE OF A LITHIUM-ION CELL MODULE

(75) Inventors: Kai Vuorilehto, Helsinki (FI); Antti Vayrynen, Tuusula (FI)

(73) Assignee: European Batteries Oy Konkurssipesa, Kuopio (FI)

( * ) Notice: Subject to any disclaimer, the term of this patent is extended or adjusted under 35 U.S.C. 154(b) by 0 days.

(21) Appl. No.: 14/131,255

(22) PCT Filed: Jul. 9, 2012

(86) PCT No.: PCT/FI2012/050720
§ 371 (c)(1),
(2), (4) Date: Feb. 6, 2014

(87) PCT Pub. No.: WO2013/007881
PCT Pub. Date: Jan. 17, 2013

(65) Prior Publication Data
US 2014/0145681 A1    May 29, 2014

(30) Foreign Application Priority Data
Jul. 8, 2011 (FI) ..................................... 20115736

(51) Int. Cl.
*H02J 7/00* (2006.01)
*H02J 7/02* (2006.01)

(52) U.S. Cl.
CPC .............. *H02J 7/0014* (2013.01); *H02J 7/0016* (2013.01); *H02J 7/022* (2013.01)

(58) Field of Classification Search
CPC ............................. H02J 7/0016; H02J 7/0031
USPC ........................................ 320/122, 134, 132
See application file for complete search history.

(56) References Cited

U.S. PATENT DOCUMENTS

| 6,007,947 | A | | 12/1999 | Mayer | |
|---|---|---|---|---|---|
| 6,133,710 | A | * | 10/2000 | Okamura | ...................... 320/122 |
| 2006/0097700 | A1 | * | 5/2006 | Studyvin et al. | .............. 320/138 |

(Continued)

FOREIGN PATENT DOCUMENTS

| EP | 1367688 | | 12/2003 |
|---|---|---|---|
| WO | 2011036760 | | 3/2011 |
| WO | WO/2011/036760 | * | 3/2011 |

OTHER PUBLICATIONS

International Search Report dated Oct. 11, 2012, corresponding to PCT/FI2012/050720.

(Continued)

*Primary Examiner* — Richard Isla Rodas
*Assistant Examiner* — Nathaniel Pelton
(74) *Attorney, Agent, or Firm* — Young & Thompson

(57) ABSTRACT

The state of charge of a lithium-ion cell module including several cells is managed by observing changes in a cell's differential capacity curve exceeding or falling short of a preset limit value during a discharging or charging process of the cell. Each of the changes is a change which is specific for this particular cell and consistent with a specific state of charge of the cell, whereby the ordinal number of a differential capacity curve change is used as a basis for determining a state of charge of the cell consistent with the change or a difference in the states of charge between two or more cells. The thus determined state of charge differences between cells are then sought to be balanced by a balancing system adapted to balance a charge.

24 Claims, 4 Drawing Sheets

(56) References Cited

U.S. PATENT DOCUMENTS

2007/0126399 A1    6/2007  Benckenstein et al.
2009/0289599 A1*  11/2009  White et al. .................. 320/120
2012/0105068 A1*   5/2012  Wang et al. .................. 324/427
2012/0105069 A1*   5/2012  Wang et al. .................. 324/427
2012/0169288 A1*   7/2012  Ueki et al. ................... 320/134

OTHER PUBLICATIONS

Finnish Search Report dated Jan. 16, 2012, corresponding to the Foreign Priority Application No. 20115736.

* cited by examiner

*) PWM-ohjattu shunttivastus

METHOD AND SYSTEM FOR MANAGING THE STATE OF CHARGE OF A LITHIUM-ION CELL MODULE

The invention relates to a method and system for managing the state of charge of a lithium-ion cell module comprising several cells, or a battery or battery pack made up thereof. Specifically, the invention relates to monitoring the states of charge of cells in such cell modules, and to balancing state of charge differences between the cells.

PRIOR ART

In order to enable utilizing the whole capacity of a cell module or battery pack without a single cell discharging under load to excessive depth (deep discharge), it is necessary that the amount of charge remaining in the cells be maintained substantially equal. Respectively, the amount of charge short of a full or other desired state of charge must be maintained substantially equal in all cells for the ability to charge all cells to full capacity without a single cell charging too much (overcharging). From the standpoint of balancing state of charge differences between cells, it is indeed absolutely necessary to have the ability to determine accurately the state of charge of all cells or at least the mutual differences thereof during both charging and loading and to balance the state of charge differences between cells on the basis of the determined states of charge or the differences therein.

The prior art discloses a variety of solutions with an objective to determine and to thereby balance the states of charge of cells. According to one solution, the determination of state of charge differences is attempted by means of terminal voltages. Another solution is known for the determination of a state of charge as a function of internal resistance or as a function of inter-cell temperature differences resulting from the loading or charging of cells.

The prior art solutions for determining the states of charge of cells nevertheless involve certain problems. Voltage, for example, is a fairly vague indicator, nor can the state of charge distribution of a cell module be determined reliably until towards the end of a main charging cycle. By this time, however, the power take-up capacity of a battery is so limited that the balancing of significant state of charge differences by means of a backup current would take too long. In addition, the open circuit voltage of for example lithium-ion cells, such as $LiFePO_4$ cells (lithium iron phosphate cell), does not have a sufficiently strong dependence on the state of charge for enabling its use for the determination of a state of charge. Loaded voltage is also an unreliable state of charge indicator, because the internal resistance of a cell is almost constant over the range of SOC=35 . . . 100%. However, resistance is strongly dependent on temperature, whereby the unbalanced temperature distribution of a cell module may distort the measuring result. Hence, the method based solely on voltage measurement is not feasible for the reliable determination of the states of charge or state of charge differences of the cells in a lithium-ion battery or battery pack.

On the other hand, the determination of internal resistance with sufficient accuracy is only possible if the cell module is loaded with a cyclically changing load, which includes sufficiently long periods of constant current. This condition is not fulfilled practically ever for example in the power sources of electric cars in normal driving.

The resistances of cell modules may also exhibit individual differences not caused by a state of charge. Accordingly, the method based on measuring inter-cell temperature differences is very slow and unreliable, because temperature differences may result from reasons other than state of charge differences between cells.

The determination of states of charge in various cells and the balancing of cells on the basis thereof will become particularly problematic in the event that the state of charge of the cells should be charged for example to a degree of charge anything other than full charge (SOC~100%). This is the case for example in most hybrid systems, in which the battery pack is never charged to full capacity for the reason that is must be ready to take up, among others, negative braking energy. If the battery pack is not charged to full capacity, a requirement for balancing is that the state of charge of every cell can be determined reliably even when the state of charge is short of full (SOC<100%).

The prior art discloses a few solutions for balancing state of charge differences between cells, such as the balancing of series connected battery cells with a so-called passive method, wherein towards the end of a charging cycle, the charging current of cells which have reached a maximum voltage is reduced by diverting some of the charging current past the cell by way of a so-called shunt circuit until all cells have reached the maximum voltage. Nevertheless, a prerequisite of this method is that the cell module is charged regularly to full capacity, the charger current can be controlled accurately, and that the system allows increasing the cell module voltage to a maximum voltage (for example in the case of $LiFePO_4$ cells 3.65 V/cell). However, if the battery pack is connected for example to the intermediate circuit of a frequency converter, the charging current cannot usually be adjusted with accuracy sufficient for making said passive balancing possible.

SUMMARY

One objective of the invention is to eliminate or at least alleviate some problems related to the prior art. According to one embodiment, the invention seeks to offer such a solution which would enable a reliable determination of the state of charge differences between cells during both charging and discharging and to thereby avoid the deep discharge of especially the weakest cells during a loading cycle and respectively the overcharge during a charging cycle. In addition, the invention also seeks to provide such a solution that would enable the state of charge differences of cells to be determined reliably also at a degree of charge other than almost empty (e.g. SOC<35%) or full (e.g. SOC>90%).

Some of the objectives of the invention are attained for example by a method of the present invention.

The method according to the invention is characterized by a method, a system an arrangement, and a computer program product.

A first embodiment of the invention comprises observing changes in the differential capacity curves of the cells of a cell module during a discharge or charge cycle of the cell module. Especially the lithium-ion cells, such as the lithium iron phosphate cell ($LiFePO_4$), have observable spikes in a differential capacity curve (dQ/dV) thereof during both a discharge and charge cycle. This is because the Li-ions occupy the carbon energy levels of a cell anode in a certain sequence. Said changes (spikes) in a differential capacity curve are changes specific for certain identical cells and always in line with a certain state of charge of the cell, and thereby have in identical cells always the same location (state of charge). According to the invention, the state of charge of a cell is determined on the basis of the ordinal number of a change in said differential capacity curve, wherein said change is always consistent with a certain state of charge in the cell.

According to the invention, there can be observed differential capacity curve changes which either exceed or fall short of a preset limit value. According to one preferred embodiment, the observed differential capacity curve changes are differential capacity curve minima, which represent the filling or draining of occupation states of carbon energy levels in a cell anode. The number of said minima is generally not less than two, but most preferably three or even more. According to one example, at least one of the minima represents a degree of cell charge value of 50-70%, more preferably 65-70%, and in a particularly preferred case about 68%.

One embodiment of the invention comprises determining the states of charge in the cells of a cell module or at least the mutual state of charge differences of several cells in the above-described manner based on the changes in differential capacities determined from the cells. According to one preferred embodiment of the invention, this can be applied for example in a management system for cell modules or battery packs for balancing the states of charge of cells, for example in the case of the states of charge of at least two different cells deviating from each other for example to the extent of at least a preset limit value during either a charging or loading cycle of the cell module.

According to one example of the invention, in the process of charging a cell module, the state of charge differences between at least two different cells are balanced by passing the charging current past the cell that has achieved a higher charge. Said bypass can be conducted for example by way of a (controllable) shunt circuit, which can be established for example by means of a zener diode to be connected parallel with the cell. Respectively, in the process of loading a cell module, the state of charge differences between at least two different cells can be balanced by transferring some the charge into such a cell whose state of charge is lower than that of at least one other cell. The transfer of charge can be conducted for example by means of a balancing unit which is in control of all cells or specific for a group of cells. The balancing process can be continued until all cells have reached a maximum voltage or some other desired level.

It should be noted, however, that the charge balancing can also be conducted in other ways, such as for example by using two-way charge transfer enabling converters in a cell- or cell module-specific fashion, whereby one and the same solution can be used in relation to both charging and discharging. In such converters can be used transformers whose primary winding is galvanically isolated from a secondary winding or secondary windings. It should also be noted that the converter can be of any type enabling a two-way charge/power transfer, preferably for example a two-way flyback converter. According to one example of the invention, the circuits associated with the primary winding of all converters can be connected to a common power path, along which the transfer of charge/power from any cell or cell module to any other cell or cell module is possible.

The invention offers distinct advantages over the prior art, such as for example the fact that the state of charge of individual cells can be monitored in real time quite accurately also with state of charge values other than substantially empty or full. This is particularly important for example in hybrid systems, wherein the battery pack is never charged to full capacity but, instead, the state of charge of the cells should be left for example at the value of about 60-70%. Specifically, the invention provides an effective balancing system for cells, such that the state of charge of all cells can be set, for example once the charging cycle is over, at some certain desired value, such as for example about 60-70%.

The system according to the invention enables determining, during both a charging and discharging cycle, the state of charge of all cells, or at least the mutual differences therebetween, with sufficient accuracy for the amount of charge left in the cells to be maintained the same by the management system. Respectively, during a charging cycle, in all batteries or cells the amount of charge short of a full state of charge can be maintained the same by the system of the invention. In fact, the invention enables in a fairly economical and reliable manner the whole capacity of a battery pack or cell module to be utilized without a single battery or cell discharging to excessive depth during a loading cycle or overcharging during a charging cycle.

DESCRIPTION OF THE FIGURES

In the next section, preferred embodiments of the invention will be described in slightly more detail with reference to the accompanying figures, in which.

DETAILED DESCRIPTION OF THE FIGURES

Figure 1A:
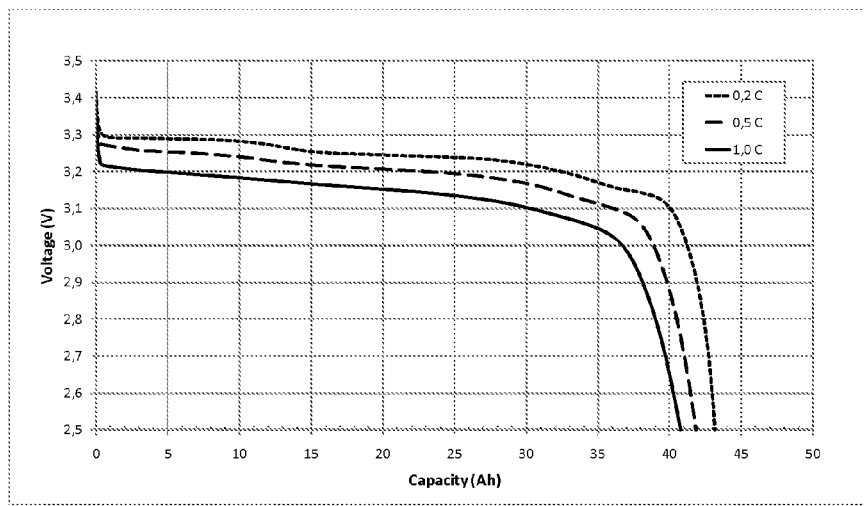
FIGS. 1A-1B show some exemplary capacity curves as the charge of a LiFePO4 cell is discharged according to one preferred embodiment of the invention.
Figure 1B:
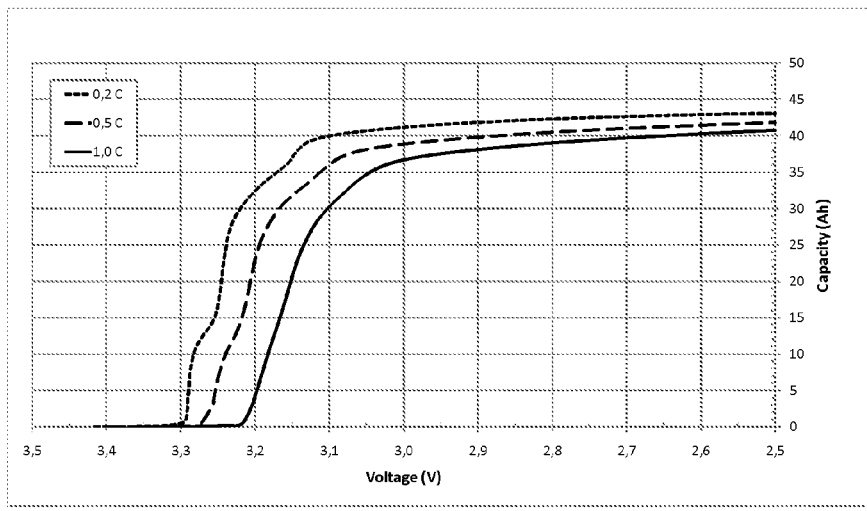
Figure 2A:
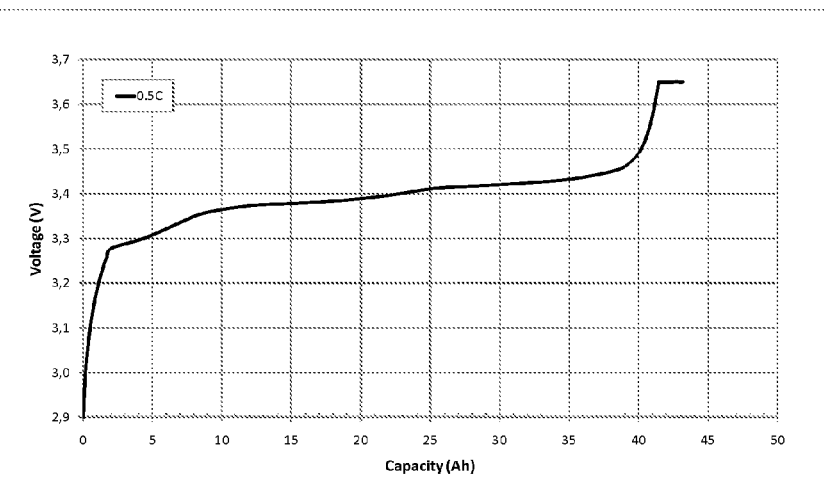
FIGS. 2A-2B show some exemplary capacity curves as a LiFePO4 cell is charged according to one preferred embodiment of the invention.
Figure 2B:
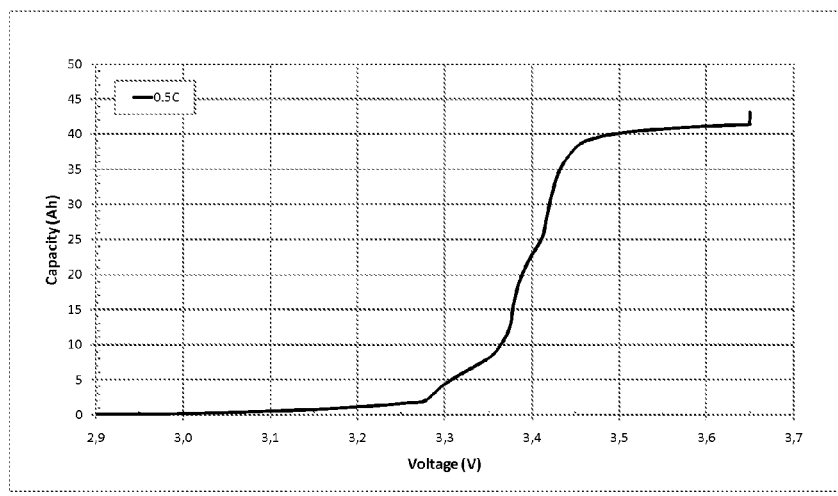

FIGS. 1A and 1B show some exemplary capacity curves as the charge of a LiFePO$_4$ cell is discharged, and FIGS. 2A and 2B some exemplary capacity curves as a LiFePO$_4$ cell is charged, according to one preferred embodiment of the invention. From FIGS. 1A and 1B can be noticed that, as the cell is discharged, the voltage within the range of output capacity only undergoes very minor changes, typically in the order of 0.1 V over a desired cell operating range, which for example in hybrid applications is typically SOC=30 . . . 80%. The same perception can also be made with regard to FIGS. 2A and 2B as the cell is charged, wherein the cell voltage only undergoes a change in the order of about 0.1 V over the desired cell operating range.

Figure 1C:
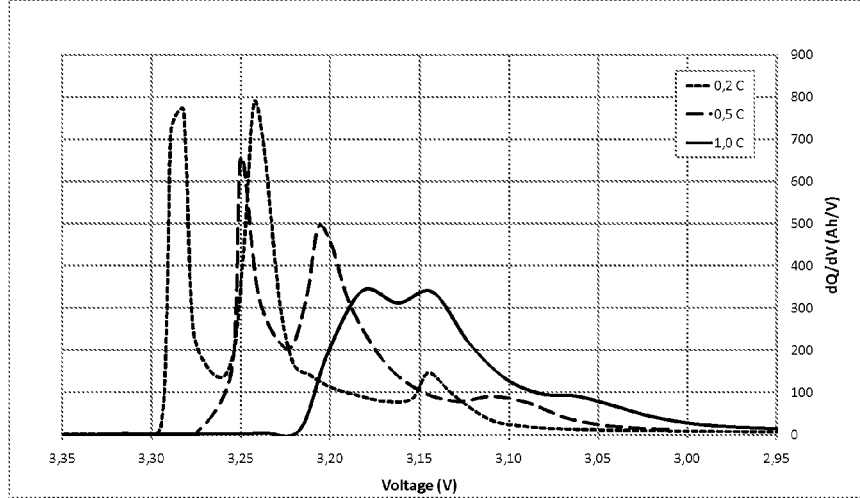
FIG. 1C shows some exemplary differential capacity curves as the charge of a LiFePO4 cell is discharged according to one preferred embodiment of the invention.
Figure 2C:
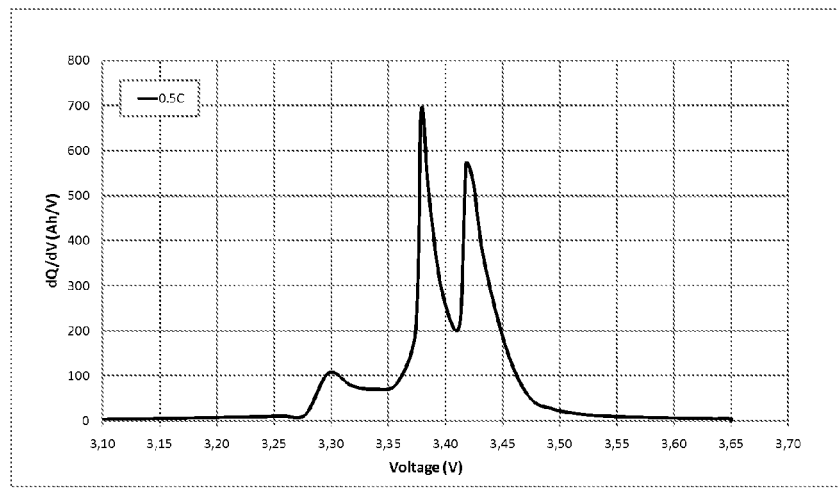
FIG. 2C shows some exemplary differential capacity curves as a LiFePO4 cell is charged according to one preferred embodiment of the invention.

On the other hand, from FIGS. 1C and 2C can be clearly seen that there are three examples of distinct spikes perceivable in the differential capacity curve [dQ/dV] of a LiFePO$_4$ cell during both discharge (FIG. 1C) and charge (FIG. 2C) cycles. The reason for this is that the anode carbon energy levels are occupied by Li-ions in a certain sequence. It is particularly notable that, with identical cells, the spikes appear in the same location (state of charge) and, because the spike location is not dependent on temperature, the phenomenon can be exploited in determining the state of charge of a cell or the mutual state of charge differences between several cells. The detected phenomenon can be applied for example in a charge management system of lithium ion batteries for balancing states of charge. According to one embodiment of the invention, it is sufficient for balancing a cell module that the states of charge of cells can be determined accurately with respect to each other, nor is it totally necessary to be precisely aware of the absolute state of charge.

In the exemplary cases shown in FIGS. 2A-2C, the charging has been conducted with a constant-current, constant-voltage method (CCCV). The charging parameters therein are 0.5 C (current), 3.65 V (voltage) and 0.03 C (exit criterion), but it should be noted that these are but a few examples of charging parameters and that the invention is not limited to just these, but also other charging parameters can naturally be used.

Figure 3:
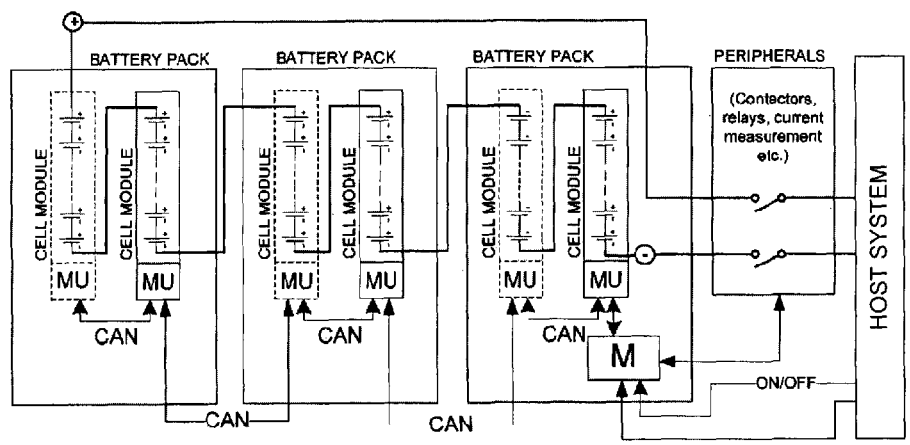
FIG. 3 shows one exemplary management system for the state of charge of cells according to one preferred embodiment of the invention.

FIG. 3 shows one exemplary management system 300 for the state of charge of cells according to one preferred embodiment of the invention, which system is most preferably adapted to carry out at least one of the following either with tools established by components or programmatically or alternatively with a combination of thereof:

preventing the voltage of a single cell from dropping below a preset limit for example by reducing the discharge current of this particular cell, preventing the voltage of a single cell from rising above a preset limit for example by reducing the charge current of this particular cell, preventing the temperature of a cell system from rising by reducing the through-cell current or by enhancing the cell cooling, preventing the charge/discharge current from exceeding a preset limit, which depends at least on the temperature and/or the SOC value of a cell or cell module, providing relevant status information about each cell or cell module for a higher system and/or a user by way of data transfer buses, regarding for example SOC values.

The management system of FIG. 3 can be for example centralized, in which case the system is included in an individual cell module and in communication with individual cells of the cell module for example by way of cables. The system can also be modular, in which case the system comprises several units (for example arranged on circuit cards), one of which is set up as a master unit (M). The units communicate with each other for example by way of some data transfer bus, such as for example by way of a CAN bus, but also other solutions known from the prior art can be relevant, such as RS232, RS485, Ethernet or USB as a few examples.

According to one preferred embodiment, the system may include not only the master unit (M) but also several slave units (MU) (as shown in FIG. 3), each of which is adapted to measure for example the voltages, temperatures and/or currents or other parameters of either individual cells or a cell group made up of several cells and to communicate the measuring data for example to the master unit (M).

According to one example of the invention, the master unit (M), or a higher level host system (HOST), is on the basis of said measuring data adapted to calculate, among others, the differential capacity curves for each cell module or even for each individual cell of a cell module for the determination of their states of charge or state of charge differences and, on this basis, for controlling a balancing system for cells or cell modules for example as described in this document. The balancing system for the states of charge of cells or cell modules can be controlled by the master unit either directly or by way of a separate peripheral which may comprise for example controllable contactors, relays and current adjustment units, as well as other prior known instruments intended for discharging and/or charging the charge of cells, and especially for balancing a state of charge. Such instruments, particularly intended balancing state of charge differences, are presented in the appended FIGS. 4A-4F.

It should be noted that at least a portion of the service performed by a master unit, slave units, and/or by higher level control instruments (peripherals, HOST), can be conducted programmatically.

Figure 4A:
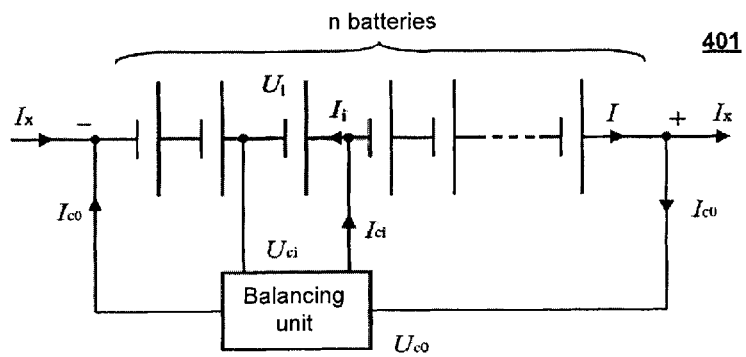
FIGS. 4A-4F show some exemplary charge balancing systems for use in a management system of the invention for the state of charge of cells according to a few preferred embodiments of the invention.

FIGS. 4A-4F illustrate a few exemplary charge balancing systems for use in a management system 300 of the invention for the state of charge of cells according to some preferred embodiments of the invention. FIG. 4A shows one balancing unit 401, the function of which is to keep a battery pack or its cell modules or cells continuously in balance (the state of charge in all cells at the same level) by charging or discharging one battery or cell at a time as determined by a control logic. The unit's DC/DC converter can have its input connected for example to the terminals of a battery pack and its output to a battery or cell to be backed up. Thus, the balancing unit's DC/DC converter operates the same way as a battery charger whose power supply is constituted by the entire battery pack of a car.

According to one embodiment, the operation of a balancing unit can be controlled for example by a management system as shown in FIG. 3 or, according to one example, by a central processing unit Console Interface Computer (CIC) based for example on an RISC processor. The on-board computer communicates with a balancing unit for example by way of a CAN bus. The CIC may obtain for example from the management system 300 measuring data about the state of a battery pack or cells and control on the basis thereof the charge transfer (DC/DC converter and relay matrix) as well as a shunt current, as presented in the following FIGS. 4B and 4C.

Figure 4B:
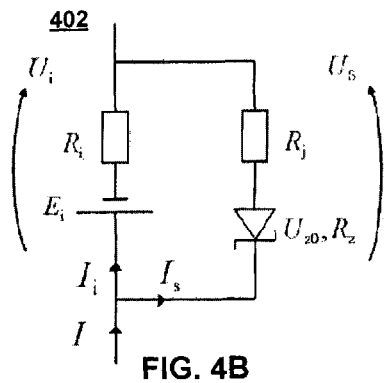

FIG. 4B shows one passive bypass element 402 for delivering a charge current at least past one cell, whereby the system is adapted, during the process of charging a cell module, to balance state of charge differences between at least two different cells by diverting some of the charge current past the cell of a higher achieved charge by means of the bypass elements 402 for example until all cells have reached a maximum voltage or some other desired level. In the case of FIG. 4B, the bypass elements 402 comprise a shunt circuit, which is established by means of a parallel-connectable zener diode enabling the shunt current to be controlled (passive adjustment). In the figure, $U_{z0}$ is the diode's zener voltage (breakdown voltage), $R_z$ its dynamic resistance, and $R_j$ resistance of the shunt circuit's conductors.

Figure 4C:
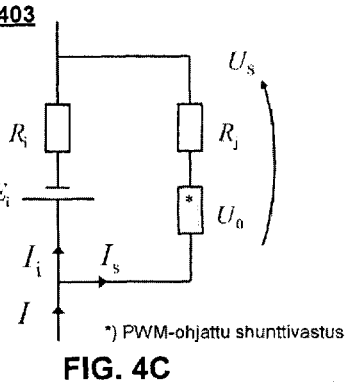

FIG. 4C shows one active balancing system 403, wherein the management system has its shunt circuit provided with a resistance, whereby a current ($I_S$) proceeding therethrough is most preferably controlled programmatically with pulse width modulation (active adjustment) by means of channel transistors. A benefit gained by this is the possibility of changing the circuit's characteristic curve for example according to cell type and temperature.

Figure 4D:
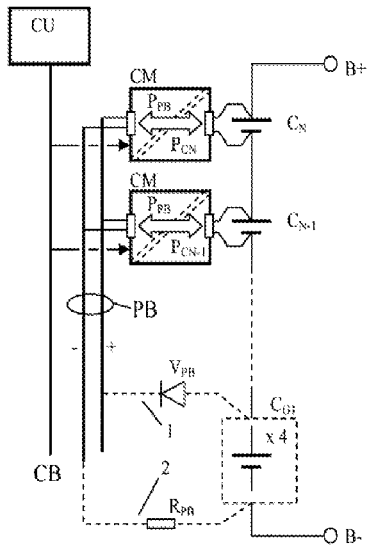

FIG. 4D shows one example of a balancing system, wherein every cell has linked therewith a balancing unit CM enabling a two-way charge transfer. The charge transfer is carried out by a power converter, having primary and secondary circuits galvanically isolated from each other, said primary circuit being at an external power bus potential $P_{PB}$ and said secondary circuit being at a cell potential $P_C$.

All balancing units CM can be linked up by a power bus PB. The power bus voltage matches preferably the voltage of a few series-connected cells, for example the voltage of four cells (about 12 Vdc) as shown in the figure. The power bus can be floating, completely separate from the battery pack, or it can be connected to one of the cell groups by means of connecting conductors 1 and 2 shown with dashed lines in the figure. The bus voltage can also be controlled to become higher than that of the cell group connected thereto, whereby the charge pulses of the bus do not circulate by way of the cell group. In this case, it is possible to use for example a diode $V_{PB}$ as shown in the figure, which prevents the higher power bus voltage from discharging into the lower cell group voltage.

According to the invention, a control unit CU managing the operation of a battery pack (which thus, according to one embodiment, can be the management system of FIG. 3 or a part of it, such as a master and/or slave unit) controls the operation of balancing units CM through the intermediary of a control bus CB in such a way that the sum of charges transferred from cells to power bus and those transferred from power bus to cells is averagely 0. By this procedure, when the power bus is connected to one of the cell groups, the charge balance of this particular cell group is not disturbed as a result of being connected to the bus. The charge balance of the power bus can be surveyed by measuring the current of either connecting conductor (1, 2) for example by means of a shunt resistance $R_{PB}$ shown in FIG. 4D. In the event that the power bus is separate from the battery pack or at a higher voltage than the group connected thereto by way of the diode $V_{PB}$, the corresponding surveillance of the charge balance can be conducted by monitoring the power bus voltage; in a balanced condition the voltage remains within set limits.

Figure 4E:
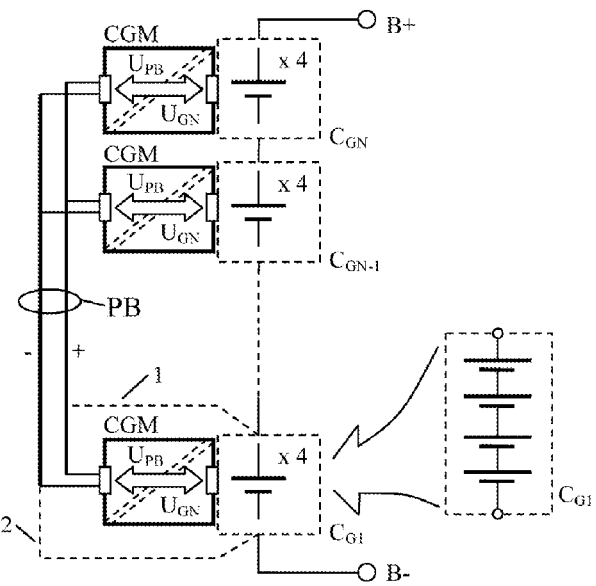

FIG. 4E shows still another example of a balancing system, in which the balancing units CGM are specific for a cell group; the figure shows a case with a common unit used for four cells. Other than that, the operation matches that of the case shown in FIG. 4D, only this time the number of secondary circuits in a balancing unit equals the number of cells connected to the unit, i.e. in this case 4 secondary circuits. Such a system offers a benefit of lower costs than those of a cell-specific system shown in FIG. 4D. Even in the example of FIG. 4E, the control unit CU, the control bus CB, the current measuring shunt $R_{PB}$ and the voltage separating diode $V_{PB}$ can have the same importance as in the example of FIG. 4D, it is just for the sake of clarity that these have not been drawn in the figure.

Figure 4F:
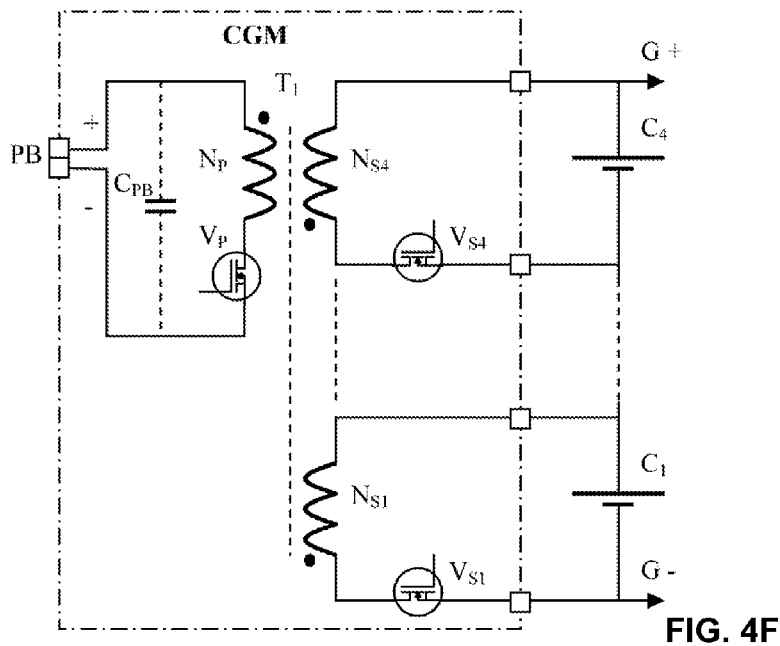

The control unit CU can be a separate unit or it can be preferably integrated with some balancing unit CGM which is more extensive than others. FIG. 4F shows in a simplified form one preferred possibility of constructing a charge transfer converter, a co-called two-way flyback converter which includes a primary circuit (a primary winding $N_P$, a primary switch $V_P$) and one (referring to the example of FIG. 4D) or more (referring to the example of FIG. 4E) secondary circuits (secondary windings $N_{S1}$-$N_{SN}$, secondary switches $V_{S1}$-$V_{SN}$). The switches are preferably MOSFET transistors whose internal structure is known to include also a diode. In view of balancing the voltage of a primary circuit's power bus connection there may be connected a capacitor $C_{PB}$, which has an advantageous effect especially when the power bus is separated from the battery pack or its voltage is higher than that of a cell group connected thereto by way of the diode.

When the converter shown in the figure is to be used for transferring a charge pulse from power bus to cell, it is a primary switch $V_P$ which is first set in a conductive state. Thus, the flyback transformer's primary winding current increases linearly until the switch is set in a non-conductive state. The energy charged in the magnetic circuit of a transformer $T_1$ discharges then into a secondary circuit which has the lowest voltage. By using power FETs whose channel resistance is so low that the voltage in a conductive state thereof is clearly lower than the forward voltage (about 0.7 V) of a FET's internal diode, for example 0.2 V, the control of secondary switches can be used for selecting into which one of cells the transformer's magnetic circuit energy will be discharged irrespective of minor voltage differences in the cell voltages. Respectively, when the converter is to be used for transferring a charge pulse from cell to power bus, it is a secondary switch $V_s$, corresponding to the desired cell which is set in a conductive state. Thus, the secondary winding current increases linearly until the switch is set in a non-conductive state. The magnetic circuit energy of a transformer $T_1$ discharges then into a primary circuit (=into a power bus) by way of the primary switch's internal diode.

In the foregoing have been described just a few embodiments for a solution of the invention. The principle according to the invention can naturally be modified within the scope of protection defined by the claims, regarding for example implementation details and fields of use. In particular, the idea according to the invention for monitoring the state of charge of cells can be applied to lithium-ion cells, such as for example to the cells of a lithium polymer battery, and especially to LiFePO cells with a graphite anode.

The invention claimed is:

1. A method for managing the state of charge of a lithium-ion cell module comprising at least two different cells, the method comprising:
    determining the states of charge of the at least two different cells with respect to each other, the state of charge for each cell of the at least two different cells being estimated by determining changes in a differential capacity curve of the cell exceeding or falling short of a preset limit value during a discharging or charging process of the cell, each of said changes being a change which is specific for a particular one of the cells and always consistent with a specific state of charge of the cell, and an ordinal number of a change in the differential capacity curve determining the state of charge of the cell consistent with said change; and
    when the states of charge of said cells deviate from each other based on the relative determination, balancing the charge difference between the cells so that the states of the charge of the at least two different cells are at a desired level, which is less than a full capacity of each of the cells.

2. The method according to claim 1, wherein the determined differential capacity curve changes are differential capacity curve minima.

3. The method according to claim 2, wherein the number of said differential capacity curve minima is not less than two.

4. The method according to claim 1, wherein, in the process of charging a cell module, the state of charge differences between at least two different cells are balanced by diverting some charge current past the cell of a higher achieved charge by way of a shunt circuit.

5. The method according to claim 1, wherein, in a process of loading the cell module, the state of charge differences between at least two different cells are balanced by transferring, by a balancing unit, some charge into one of the cells with a state of charge lower than that of at least one other cell.

6. The method according to claim 1, wherein said cell or cell module is included in a lithium polymer battery.

7. A system for managing the state of charge of a lithium-ion cell module including at least two different cells, the system comprising:
    means for determining the state of charge of the at least two different cells with respect to each other, the state of charge for each cell of the at least two different cell being estimated by determining changes in a differential capacity curve of the cell exceeding or falling short of a preset limit value during a discharging or charging process of the cell, each of said changes being a change which is specific for a particular one of the cells and always consistent with a specific state of charge of the cell, and an ordinal number of a change in the differential capacity curve determining the state of charge of the cell consistent with said change, wherein the system is configured to balance the charge difference between cells, when the states of charge of said cells deviate from each other based on the relative determination so that the states of the charge of the at least two different cells are at a desired level, which is less than a full capacity of each of the cells.

8. The system according to claim 7, wherein the determined differential capacity curve changes are differential capacity curve minima, the number of which is not less than two.

9. The system according to claim 7, further comprising bypass elements configured to deliver the charge current at least past one cell, wherein the system is configured, in the process of charging a cell module, to balance the state of charge differences between at least two different cells by diverting some charge current past the cell of a higher achieved charge by said bypass elements.

10. The system according to claim 9, wherein said bypass elements that deliver the charge current at least past one cell comprise a shunt circuit which is established by a parallel-connectable zener diode.

11. The system according to claim 7, wherein the system comprises a balancing unit, which has an input connected to cell module terminals working across at least two cells, and the system is configured, in a process of loading the cell module, to balance the state of charge differences between at least two different cells by transferring some charge by said balancing unit into one of the cells with a state of charge lower than that of at least one other cell.

12. The system according to claim 7, wherein said cell or cell module is included in a lithium polymer battery.

13. An arrangement, comprising:
a lithium polymer battery pack made up of numerous cells and cell modules, as well as a system as set forth in claim 7 for managing the state of charge of said cells.

14. A computer program product stored on a non-transitory medium for managing the state of charge of a lithium-ion cell module comprising several cells, the computer program product comprising a computer program code, which is adapted to carry out the method as set forth in claim 1 as said computer program product is executed in a data processing device.

15. The method according to claim 1, wherein the desired level comprises 60-70% of the full capacity of charge of the cell.

16. The method according to claim 3, wherein the number of the differential capacity curve minima is three.

17. The method according to claim 3, wherein at least one of the minima represents a degree of cell charge value of 50-70%.

18. The method according to claim 17, wherein at least one of the minima represents a degree of cell charge value of 65-70%.

19. The method according to claim 18, wherein at least one of the minima represents a degree of cell charge value of about 68%.

20. The method according to claim 6, wherein the cell or cell module is included in a $LiFePO_4$ battery provided with a graphite anode.

21. The system according to claim 8, wherein the number of the differential capacity curve minima is three.

22. The system according to claim 8, wherein at least one of the minima represents a degree of cell charge value of 50-70%.

23. The system according to claim 22, wherein at least one of the minima represents a degree of cell charge value of 65-70%.

24. The system according to claim 23, wherein at least one of the minima represents a degree of cell charge value of about 68%.

* * * * *